G. W. GRISWOLD.
REMOVABLE CALK, &c., FOR HORSESHOES.
No. 43,747.            Patented Aug. 2, 1864.
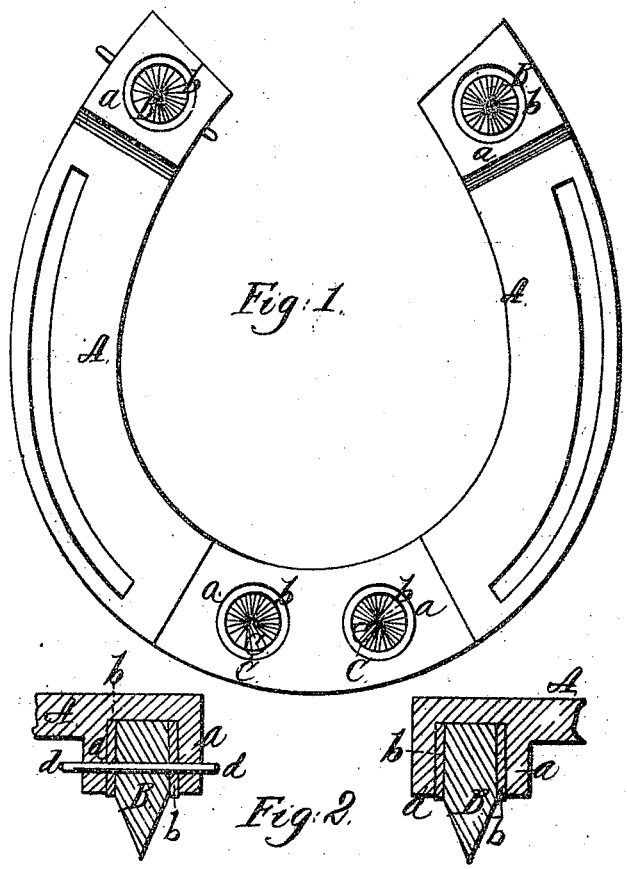

UNITED STATES PATENT OFFICE.

GEORGE W. GRISWOLD, OF NEW YORK, N. Y.

IMPROVEMENT IN REMOVABLE CALKS FOR HORSESHOES.

Specification forming part of Letters Patent No. 43,747, dated August 2, 1864.

*To all whom it may concern:*

Be it known that I, GEORGE W. GRISWOLD, of New York, in the county of New York and State of New York, have invented certain new and useful Improvements in Removable Calks and Toe-Pieces for Horseshoes; and I do hereby declare the following to be a full, clear, and exact description of the same, reference being had to the accompanying drawings, making a a part of this specification, in which—

Figure 1 represents the under side of a horseshoe. Fig. 2 represents sections through the calks and that portion of the shoe to which they are attached. Fig. 3 represents a section through the toe-pieces and that portion of the shoe to which they are attached.

Similar letters, where they occur, denote like parts in all the figures.

I am aware that many forms of removable calks and toe-pieces for horseshoes have been devised; but none so far have been perfect enough to bring them into general use. The main difficulty appears to be a want of sufficient firmness and at the same time a degree of elasticity, so as to prevent the animal from straining and injuring himself upon hard roads or pavements.

My invention consists in setting the calks or toe-pieces in a surrounding or bed of vulcanized or hardened rubber, or its equivalent elastic material, so as to break the force of the jar or strain upon the feet of the animal, but at the same time make them sufficiently rigid for all practical purposes.

To enable others skilled in the art to make and use my invention, I will proceed to describe the same with reference to the drawings.

A represents a horseshoe, which may be of any of the known forms; and B represents the calks, and C the toe-pieces thereof. I make sockets or recesses $a$ in the shoe where the calks or toe-pieces are to be placed, and surround the calk or toe-piece with rubber or its equivalent, $b$, and then insert both into the socket, as shown in the drawings. In some cases, if so preferred, the rubber may be under as well as around the calk or toe-piece, as shown at $c$, Fig. 3.

The calks or toe-pieces may be secured to the shoe by a pin, $d$, or by a screw, key, or any other well-known device; or a screw may be cut upon the calk or toe-piece, so that it may be screwed into the shoe, and if found desirable to allow the piece to yield slightly in the line of its length, it may be done by so adapting the fastening as to admit of such yielding.

The calks and toe-pieces are best made of steel; and I have shown them as pointed, though they may be of any other form, or roughened in any suitable manner to prevent slipping. The pieces may be removed or replaced without taking off the shoe from the animal's foot, and by being elastic or yielding they are not so apt to tear or wrench oft as when rigid.

I am aware that spring-calks have been assayed, the spring being of metal and attached to the shoe. They do not answer a good purpose.

I am also aware that rubber has been placed under and between horseshoes and embedded in a groove therein. I lay no claim to any such, my invention being applicable only to calks or toe-pieces embedded in rubber in suitable recesses and held there by the pressure of the rubber or by the aid of pins, screws, or keys; or the calk may be embedded in rubber in a metallic ferrule or sleeve, and the sleeve screwed or otherwise fastened to the shoe, which would make them more readily removable for repairs or replacement.

Having thus fully described the nature, object, and purpose of my invention, what I claim therein as new, and desire to secure by Letters Patent, is—

Surrounding or embedding removable calks or toe-pieces for horseshoes in vulcanized rubber or other equivalent elastic material for the purpose of holding the calks firmly in place and relieving the strain or jar upon the foot of the animal, substantially as described.

G. W. GRISWOLD.

Witnesses:
    J. A. GEISSENHAINER,
    DENNIS $\times$ CASY.
          his mark.